United States Patent
Fieback et al.

(10) Patent No.: US 8,262,925 B2
(45) Date of Patent: Sep. 11, 2012

(54) METHOD FOR PRODUCING A PHASE-CHANGE MATERIAL COMPOSITION

(75) Inventors: Klaus Fieback, Michendorf (DE); Dirk Carsten Buettner, Berlin (DE); Angelo Schuetz, Rudolstadt (DE); Stefan Reinemann, Rudolstadt (DE)

(73) Assignees: Rubitherm Technologies GmbH, Berlin (DE); Thueringisches Institut fuer Textil- und Kunststoff-Forschung E.V., Rudolstadt (DE)

( * ) Notice: Subject to any disclaimer, the term of this patent is extended or adjusted under 35 U.S.C. 154(b) by 0 days.

(21) Appl. No.: 12/736,258

(22) PCT Filed: Mar. 25, 2009

(86) PCT No.: PCT/EP2009/053526
§ 371 (c)(1),
(2), (4) Date: Oct. 26, 2010

(87) PCT Pub. No.: WO2009/118344
PCT Pub. Date: Oct. 1, 2009

(65) Prior Publication Data
US 2011/0193008 A1    Aug. 11, 2011

(30) Foreign Application Priority Data
Mar. 26, 2008    (DE) .......................... 10 2008 015 782

(51) Int. Cl.
*C09K 3/18* (2006.01)
(52) U.S. Cl. .......................................... 252/70; 252/71
(58) Field of Classification Search .................. None
See application file for complete search history.

(56) References Cited

U.S. PATENT DOCUMENTS

| | | | |
|---|---|---|---|
| 4,908,166 A | 3/1990 | Salyer | |
| 5,718,835 A * | 2/1998 | Momose et al. | 252/73 |
| 2002/0105108 A1 | 8/2002 | Hartmann et al. | |
| 2003/0151030 A1 | 8/2003 | Gurin | |
| 2005/0208286 A1 | 9/2005 | Hartmann et al. | |
| 2006/0073332 A1 | 4/2006 | Huang et al. | |
| 2006/0124892 A1 | 6/2006 | Rolland et al. | |

FOREIGN PATENT DOCUMENTS

| | | |
|---|---|---|
| EP | 0 747 431 | 12/1996 |
| JP | 59-170180 | 9/1984 |
| JP | 07-048561 | 2/1995 |
| WO | WO 98/12366 | 3/1998 |

(Continued)

OTHER PUBLICATIONS

International Search Report.

(Continued)

*Primary Examiner* — Necholus Ogden, Jr.
(74) *Attorney, Agent, or Firm* — Collard & Roe, P.C.

(57) ABSTRACT

The invention relates to a method for producing a low-exuding preferably non-exuding polymer-bonded phase-change material composition containing phase-change material, characterized in that the phase-change material is liquefied, the liquid phase-change material is introduced into an extruder at a temperature of between 50° C. and 130° C., however at least 20° C. to 70° C. above the melting point of the phase-change material into which the polymer is also introduced, wherein the extruder comprises mixing transport and holder elements and the introduction of the phase-change material into the extruder in the extrusion direction is performed after the polymer.

16 Claims, 5 Drawing Sheets

FOREIGN PATENT DOCUMENTS

WO     WO 01/05581     1/2001

OTHER PUBLICATIONS

Figure 1:
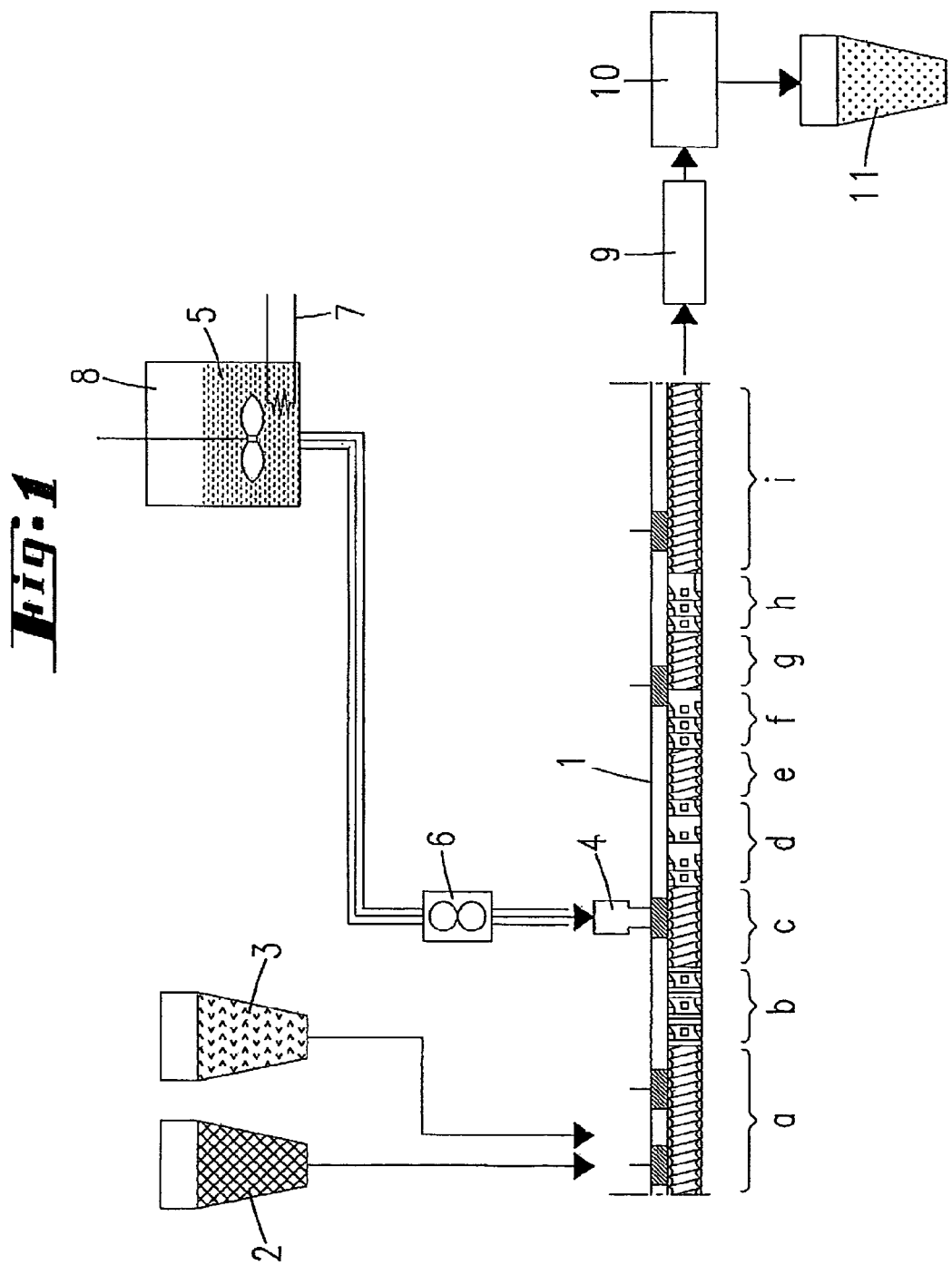

Salyer, I. O. et al., "Phase change materials for heating and cooling of residential buildings and other applications," Proceedings of the 25$^{th}$ Intersociety Energy Conversion Engineering Conference, Aug. 1990, New York, USA, vol. 4, pp. 236-243. XP-000214840. (ISR).

Krupke et al., "Labor & more," Apr. 2007, pp. 66-69. (Spec, p. 4).

* cited by examiner

OMPG  
Paraffin-copolymer blend  
100 μm  
HV = 15.00 kV  
Enlargement = 30 X  
Working distance 11 mm OMPG  
Paraffin-copolymer blend  
10 μm  
HV = 0.00 kV  
Enlargement = 350 X  
Working distance 11 mm OMPG  
Paraffin-copolymer blend  
1 µm  
HV = 0.00 kV  
Enlargement = 1.25 K X  
Working distance 10 mm OMPG  
Paraffin-copolymer blend  
20 µm  
HV = 15.00 kV  
Enlargement = 100 X  
Working distance 11 mm OMPG  
Paraffin-copolymer blend  
20 μm  
HV = 15.00 kV  
Enlargement = 75 X  
Working distance 11 mm OMPG  
Paraffin-copolymer blend  
20 μm  
HV = 15.00 kV  
Enlargement = 100 X  
Working distance 11 mm

METHOD FOR PRODUCING A PHASE-CHANGE MATERIAL COMPOSITION

CROSS REFERENCE TO RELATED APPLICATIONS

This application is the National Stage of PCT/EP2009/053526 filed on Mar. 25, 2009, which claims priority under 35 U.S.C. §119 of German Application No. 10 2008 015 782.1 filed on Mar. 26, 2008, the disclosure of which is incorporated by reference. The international application under PCT article 21(2) was not published in English.

The invention relates to a process for producing a phase change material composition, which is low-exudation, preferably exudation-free, is polymer-bound, and comprises phase change material (PCM).

Such processes and phase change materials have already become known in various embodiments. Reference is made, for example, to EP 0 747 431 B1, WO 98/12366, US 2006/0124892 A1, U.S. Pat. No. 4,908,166 A1, US 2002/0105108 A1, US 2006/0124892 A1 and US 2005/0208286 A1. Also salt-based phase change materials in particular are to be considered as phase change materials.

Many previous applications of polymer-bound phase change materials on a relatively large scale for heat management in thermoplastic fibers, slabs, pellets, etc. have failed because the processing method for the incorporation of unencapsulated PCM materials is firstly too complex (US 2002/0105108, US 2005/0208286), since it involved first mixing the unencapsulated PCM in a low molecular weight polymer with PCM affinity in a first step, and then incorporating it into a higher molecular weight polymer matrix as a pelletized intermediate via a melt compounding route in a single-screw extruder in a subsequent step. Secondly, in the case of relatively high contents of PCM in a polymer matrix, exudation of the PCM component occurred under relatively high thermal and pressure stress. Previous attempts to counteract this exudation have involved, in the case of large-area products composed of PCM-polymer composites (slabs), completely sealing the surfaces with aluminum foil to counteract the escape of the PCM component, liquefied at the phase transition point (US 2006/0124892). In the case of use of PCM composite materials in the form of heat storage pellets for heat management in water-based heat storage vessels, the result is conglutination of the heat storage pellets as a result of PCM material which has exuded to the surface. In the case of high contents of PCM in a polymer matrix (PCM>60% by weight), the mechanical strength of the products based on PCM-polymer composites (slabs, pellets, other geometric shaped bodies) decreases significantly. There has been no lack of attempts to improve the thermal conductivity of the PCM composites by adding mineral additives, such as, for example graphite, in order to accelerate the absorption and release of thermal energy over time.

Proceeding from the prior art cited, it is an object of the invention to specify a process for producing a low-exudation, preferably exudation-free, phase change material with increased mechanical strength and substantially improved resistance to heat distortion and/or improved thermal conductivity, which brings the desired success coupled with favorable producibility.

A possible way of achieving this object, according to a first inventive concept, is given by the subject matter of claim 1, it being specified that the liquid or liquefied phase change material is introduced at a temperature between 50° C. and 130° C., but in any case 20° C. to 70° C. above the melting temperature of the phase change material, into an extruder into which the polymer is or the polymers are also introduced, said extruder having kneading, conveying and baffle elements, and that the introduction of the phase change material into the extruder is undertaken immediately downstream of the introduction of the polymer in the direction of extrusion, specifically in a region in which a first intensive kneading action on the polymer has already taken place. The phase change material is thus introduced into the extruder not only at relatively high temperature but also into a region in which the polymer material has already undergone a certain degree of thorough kneading. Specifically, the introduction is preferably into a first calming section essentially having the purpose merely of conveying the material. Owing to the high temperature of the phase change material, good fluidic properties of the phase change material on introduction are ensured. The polymers introduced (preferably polyethylene, especially low-density polyethylene, for example also diblock and triblock copolymers) act both as a dispersion matrix and polymer matrix at the same time. PMMA polymer introduced additionally can preferably act especially as a viscosity promoter and synergistic component in the case of an improved development of a three-dimensional network of diblock and triblock copolymers in the PCM-polymer composite, and in particular improve both the exudation behavior of the PCM component from the PCM-polymer composites under elevated thermal and pressure stress and improve the mechanical stability of the shaped bodies obtained from the PCM-polymer composite.

The result is improved cycling stability, i.e. improved heat storage and heat release performance. A further result is improved thermal and mechanical properties. The mechanical heat distortion resistance is increased and the thermal conductivity is improved.

Room temperature solid PCM materials with phase transition temperatures above 50° C. can also be metered into the intake zone of the extruder, but inadequate cooling of the intake zone here can cause both intake problems for the polymer components, and insufficiently-uniform, homogeneous distribution and exudation-free, in situ-encapsulation of the PCM component in the particular block copolymer matrix or in the polymer matrix blend composed of PMMA and block copolymers.

Carbon nanotubes (CNTs) are microscopically small tubular structures (molecular nanotubes) composed of carbon. The diameter of the tubes is usually in the range from 1 to 50 µm, though tubes with a diameter of up to 0.4 µm have also been produced. Lengths of several millimeters for single tubes and up to 20 cm for tube bundles have already been achieved. It is important that at least one of the dimensions (diameter) of the nanotubes is within the nano range, the result being that the properties of these nanoparticles differ significantly from those having the same composition but not having diameters in the nanometer range.

It has been found in tests that, surprisingly, the additional use of small amounts of carbon nanotubes (1-5% by weight, based on the product leaving the extruder), preferably of multiwall carbon nanotubes, not only improves the in situ encapsulation of the PCM in the pure block copolymer or in the block copolymer/PMMA blend matrix and hence further improves the exudation behavior of the PCM under elevated pressure and temperature loading, but also increases the mechanical stability and the thermal conductivity of the PCM-polymer composites. Regarding carbon nanotubes, reference is made, for example, to the publication in "Labor & more", 04/07, p. 66 to 69, by the authors Dr. Ralph Krupke, Dr. Aravind Vijaraghavan, Dr. Frank Hennrich and Prof. Horst Hahn. The multiwall carbon nanotubes also significantly improve the strand formation performance (increase in strand strength) of the polymer melt on emergence from the extruder and hence provide increased process reliability in the pelletization stage of the melt compounding route according to the invention. The development of an independent nanostructured secondary network, preferably based on the multiwall carbon nanotubes with the affinitive PCM component within a submicron polymer network of the diblock or triblock copolymers containing PMMA and PCM, can completely or in any case virtually completely suppress the exudation of the PCM component at contents of up to 80% by weight of PCM.

The multiwall carbon nanotubes used likewise have the role of suppressing the exudation of the PCM component out of the polymer composite, especially when liquid or liquefying PCM materials are already present in the polymer composites at room temperature or human body temperature.

Even with liquid paraffin alone, the multiwall carbon nanotubes form a relatively high-viscosity network structure which then interacts with the PMMA/block copolymer network to form an even denser network structure for enclosed PCM.

The phase change material used is preferably unencapsulated paraffin.

By virtue of the melt compounding route practiced, it is possible, using the polymers and additives claimed, to use paraffinic PCM materials with phase transition temperatures of −4° C. to 80° C.

By virtue of the in situ polymer encapsulation of the PCM component (paraffin) within the PMMA/block copolymer network structure formed, it is possible to incorporate up to 75 percent by weight of paraffin into the polymer composites obtained, which are still pelletizable and can be processed directly from the extrusion melt by means of additional suitable equipment (slot die, draw-off calendar, spinneret dies) to give further shaped bodies (slabs, thick films, nonwovens).

Further features of the invention are explained below, and also in the description of the figures, often in their preferred arrangement with respect to the concept claimed, as discussed above. However, they may also be of significance in an arrangement of only one or more than one individual feature of the concept claimed, or independently.

Thus, it is firstly preferred that the extruder is a screw extruder, especially a twin-screw extruder. FIG. 1 shows a preferred arrangement of the configuration of the screw elements, of the peripheral metering technology, and of the addition sites for the polymer components and the PCM. The liquid or liquefied paraffin (5) is preheated in a melting and preheating vessel to the particular addition temperature required and metered with a delivery pump (6) via a feed probe into an extruder, preferably a twin-screw extruder.

Solid paraffin flakes can also be metered into the intake zone of the extruder by means of a metering weighing means (2) together with the particular polymer component (3). The PMMA component can additionally be metered-in either via the polymer metering weighing means (2) or the metering weighing means (3). Solid additives, such as, for example, the multiwall carbon nanotubes claimed, are likewise additionally metered into the intake zone of the extruder via a specific powder metering weighing means.

In addition, in a preferred embodiment, the extruder can be operated at a speed between 100 and 1200 revolutions per minute (rpm), preferably between 300 and 1200 rpm, more preferably between 800 and 1200 rpm. In accordance with the disclosure, these numerical ranges specified also include all intermediate values, specifically in steps of one revolution per minute. In this context, such a step may be undertaken from the lower and/or upper limit toward the other limit in each case. With relatively higher speeds based on the range specified, in particular, favorable intimate mixing of a block copolymer, such as, for example Kraton or Septon as an additive, with, for example, PMMA as the second polymer matrix between the first conveying zone and the first kneading zone can be achieved within a desired short time span, which is also a prerequisite for the aim of downstream intimate mixing with the phase change material, especially paraffin, in downstream conveying and kneading zones.

The residence time begins with feeding-in of the polymer or of the polymers and of the additives, which are fed in first, preferably at the same time. In any case, the residence time begins, however, with entry of the polymer- or additive-related component fed in later. This component is already mixed intimately in the first conveying zone before the phase change material, such as, for example paraffin, enters.

It is also preferred that a residence time of the melt in the extruder, based on the polymer matrix and then the mixture of the polymer matrix with the phase change material, is between one and four minutes. The numerical residence time range mentioned also includes, in accordance with the disclosure, all intermediate values, in particular in steps of one second. In this context, the intermediate values from the lower and/or upper limit to the other limit in each case can impose a limitation.

The polymer materials used may be very different kinds of materials, for example LDPE (low-density polyethylene), HDPE (high-density polyethylene), LLDPE (linear low-density polyethylene), polymethyl methacrylate, and also di- and triblock copolymers based on ethylene, styrene and butadiene comonomers, and others.

The amount of the polymer material introduced into the extruder preferably corresponds to 10%-40% of the phase change material composition ultimately attained. In the end product attained, the phase change material composition, 10-40 percent by weight is thus then the polymer matrix. With regard to the introduction of the polymer material, the disclosure here again includes all intermediate values, especially in $\frac{1}{10}$ steps. Such a step may restrict the range specified from the lower and/or upper limit toward the other limit in each case.

It is additionally preferred that additives are added. In this respect, the phase change material is preferably introduced after the introduction of the matrix polymer and of the additive, specifically within a range in which a first kneading action on the mixture of polymer and additive has already taken place.

Especially in an amount of 1-20 percent by weight based on the phase change material composition produced. In this respect too, all intermediate values are included, especially in $\frac{1}{10}$ percent by weight steps. This means that the range of $\frac{1}{10}$ percent steps specified may be restricted from the lower and/or upper limit toward the other limit in each case.

An additive may in particular be a block copolymer. Examples of block copolymers useful as such include styrene copolymers such as SEBS, SEEPS and SBS. In addition also especially the copolymers known by the trade names Kraton-G and Septon. In addition also propylene block copolymers such as EPR.

A further preferred additive is that of carbon nanotubes. Specific examples used may be MWCNT (multiwall carbon nanotubes) and SWCT (single-wall carbon nanotubes), with or without chemical modification. These are nanostructures with a ratio of length to diameter of 1:100 to 1:1000 or more, in some cases even up to 1:1 000 000 or more. They are formed by cylindrical carbon molecules. The ranges specified in each case also include all intermediate values in steps of 1, whether as a limitation of the range from the top and/or from the bottom.

The dwell time of the materials in the extruder is more preferably such that the residence time is not less than 2 minutes in any case. Preference is thus given to a dwell time in the range from 2 to 5 minutes, this range also including all intermediate values, especially in steps of 1 second. This means steps from the lower and/or upper limits toward the other limit in each case.

It is also preferred that the temperature in the extruder is adjusted such that it is at least 20° C.-180° C., preferably 50° C.-150° C., above the feed temperature of the phase change material. These temperature ranges mentioned also include all intermediate values, especially in 1° C. steps. In this case too, such a step may be undertaken from the lower or upper limit to the other limit in each case.

It is additionally preferred that the phase change material composition obtained has a proportion in the phase change material of 60% or more, especially 70% or more, more preferably 75% or more, up to 80%, particular preference being given to a range of 65-75%. In this context too, the disclosure includes all intermediate values, especially in 1/10 percent steps, such that the phase change material may thus also be from 60.1% or more etc. The intermediate values relate in particular also to restrictions in the respective ranges specified, whether from above and/or from below.

EXAMPLES

Example 1

Hot phase change material (RT58 paraffin from Rubitherm Technologies GmbH) with a temperature of 120° C. was fed via a hermetically sealed feed probe into a ZSK25 twin-screw extruder (from COPERION) with a ratio of length to diameter of 40:1, into a melt stream consisting of PMMA (carrier polymer) and phase-compatibilizing additive (SEBS, trade name Kraton G 1651) in the screw zone region between the first kneading zone and second conveying zone. By means of a screw speed of 1000 rpm and a total throughput of PMMA/Kraton G 1651/RT58 of 5 kg/h, a mean residence time of 2.5 minutes was achieved. The required homogeneous mixing of all three use components was achieved. The first two zones of the extruder were set to temperatures of 260° C. and 250° C. respectively.

The phase change material composition attained was:
  75 percent by weight of PCM (Rubitherm RT58, Rubitherm Technologies GmbH)
  15 percent by weight of SEBS (Kraton G 1651)
  10 percent by weight of PMMA.

After passage through a sufficiently adjusted water cooling zone, it was possible to form, draw and pelletize a stable strand from the melt discharge die. The pellets obtained had, in DSC (differential scanning calorimetry, thermal calorimetry test methodology for determination of melting and crystallization points of materials), a phase change enthalpy of 135 J/g. The phase change material composition exhibited very good cycling stability and was found, in relevant tests involving the simulation of 30 thermal load change cycles (20° C.↔85° C.), both in a water medium and in the dry state, to be very resistant to exudation of the phase change material (paraffin).

A sample of these pellets was also subjected to an extraction test in an ethylene glycol/water mixture containing 50 percent by weight of each (parts by mass of water to parts by mass of ethylene glycol), in 30 successive temperature cycles between 30° C. and 105° C., each heating and cooling cycle having lasted 8 h. The extract solution was transparent. The proportion of paraffin in the ethylene glycol/water extract solution was determined to be <50 ppm. The pellets did not conglutinate either in the hot or in the cooled state.

Example 2

Hot PCM (RT58 paraffin from Rubitherm Technologies GmbH) with a temperature of 120° C. was fed via a hermetically sealed feed probe into a ZSK25 twin-screw extruder (from COPERION) with an l/d ratio of 40:1, into a melt stream consisting of PMMA (carrier polymer) and phase-compatibilizing additive (SEEPS (Septon™ 4055, KURARAY Co. Ltd)) in the screw zone region between the first kneading zone and second conveying zone. By means of a screw speed of 1000 rpm, a total throughput of PMMA/KRATON G 1651/RT58 of 5 kg/h, a mean residence time of 2.5 minutes for the required homogenization of all three use components was established. The first two zones of the extruder were set to temperatures of 270° C. and 265° C. respectively. The phase change material composition attained was as follows:
  60 percent by weight of PCM (Rubitherm RT58, Rubitherm Technologies GmbH)
  15 percent by weight of SEEPS (Septon™ 4055, KURARAY Co. Ltd)
  25 percent by weight of PMMA.

After passage through a sufficiently adjusted water cooling zone, it was possible to form, draw and pelletize a very stable strand from the melt discharge die. The pellets obtained had, in DSC, a phase change enthalpy of 100 J/g. The polymer carrier-PCM material exhibited very good cycling stability and were found, in relevant tests involving the simulation of 30 thermal load change cycles (20° C. 85° C.), both in a water medium and in the dry state, to be very resistant to exudation of the PCM (paraffin).

A sample of these pellets was also subjected to an extraction test in an ethylene glycol/water mixture containing 50 percent by weight of each (parts by mass of water to parts by mass of ethylene glycol), in 30 successive temperature cycles between 30° C. and 105° C., each heating and cooling cycle having lasted 8 h. The extract solution was transparent. The proportion of paraffin in the ethylene glycol/water extract solution was determined to be <50 ppm. The pellets did not conglutinate either in the hot or in the cooled state.

Both the pellets obtained and the injection-molded products (test specimens) produced therefrom had significantly improved heat distortion resistance.

Example 3

Hot PCM (RT58 paraffin from Rubitherm Technologies GmbH) with a temperature of 120° C. was fed via a hermetically sealed feed probe into a ZSK25 twin-screw extruder (from COPERION) with an l/d ratio of 40:1, into a melt stream consisting of LLDPE (carrier polymer) and phase-compatibilizing additive (multiwall carbon nanotubes, NANOCYL S.A. Belgium) in the screw zone region between the first kneading zone and second conveying zone. By means of a screw speed of 1000 rpm, a total throughput of LLDPE/MWCNT/RT58 of 5 kg/h, a mean residence time of 2.5 minutes for the required homogenization of all three use components was established. The first two zones of the extruder were adjusted to a temperature of 220° C. The phase change material composition was as follows:

60 percent by weight of PCM (Rubitherm RT58, Rubitherm Technologies GmbH)
4 percent by weight of SEBS (MWCNT, NANOCYL S.A.)
36 percent by weight of LLDPE.

After passage through a sufficiently adjusted water cooling zone, it was possible to shape, draw and pelletize a very stable and very smooth strand from the melt discharge die.

Further examples which gave an acceptable but nonoptimal result:

Example 4

Hot PCM (RT58 paraffin from Rubitherm Technologies GmbH) with a temperature of 120° C. was fed via a hermetically sealed feed probe into a ZSK25 twin-screw extruder (from COPERION) with an l/d ratio of 40:1, into a melt stream consisting of the carrier polymer SEBS (Kraton G 1651) in the screw zone region between the first kneading zone and second conveying zone. By means of a screw speed of 1000 rpm, a total throughput of Kraton G 1651/RT58 of 5 kg/h, a mean residence time of 2.5 minutes for the required homogenization of the two use components was established. The first two zones of the extruder were set to temperatures of 270° C. and 260° C. respectively. The phase change material composition attained was as follows:
65 percent by weight of PCM (Rubitherm RT58, Rubitherm Technologies GmbH)
35 percent by weight of SEBS (Kraton G 1651).

After passage through a sufficiently adjusted water cooling zone, it was possible to draw and pelletize a strand which was stable but very elastic and tacky in nature from the melt discharge die. The pellets obtained according to this formulation had, in DSC, a phase change enthalpy of 112 J/g. The polymer carrier-PCM material exhibited very good cycling stability and was found, in relevant tests involving the simulation of thermal load change cycles (20° C.↔85° C.), still to be satisfactory with regard to exudation. A temperature above 95° C. and simultaneous slight pressure stress resulted, however, in the exudation of the PCM.

Example 5

Hot PCM (RT58 paraffin from Rubitherm Technologies GmbH) with a temperature of 120° C. was fed via a hermetically sealed feed probe into a ZSK25 twin-screw extruder (from COPERION) with an l/d ratio of 40:1, into a melt stream consisting of LLDPE (carrier polymer) and phase-compatibilizing additive SEBS (Kraton G 1651) in the screw zone region between the first kneading zone and second conveying zone. By means of a screw speed of 1000 rpm, a total throughput of Kraton G 1651/RT58 of 5 kg/h, a mean residence time of 2.5 minutes for the required homogenization of these three use components was established. The first two zones of the extruder were adjusted to a temperature of 220° C. The phase change material composition was as follows:
70 percent by weight of PCM (Rubitherm RT58, Rubitherm Technologies GmbH)
15 percent by weight of SEBS (Kraton G 1651)
20 percent by weight of LLDPE.

After passage through a sufficiently adjusted water cooling zone, it was possible to form, draw and pelletize a stable strand from the melt discharge die. The pellets of this formulation obtained had, in DSC, a phase change enthalpy of 135 J/g. The polymer carrier-PCM material did exhibit a very good cycling stability, but was found, in the relevant tests involving the simulation of multiple thermal load change cycles (20° C.↔85° C.), still to be unstable with respect to the exudation of the PCM (paraffin). The exudation occurred especially when pressure stress also occurred at the same time at the test temperature of 85° C.

The invention also provides a polymer-bound phase change material composition having a content of phase change material and carbon nanotubes as an additive. The polymer materials present may be one or more of the aforementioned materials, also with regard to the proportions already specified above. With regard to possible further additives which may in any case be used additionally, reference is made to the above disclosure. In relation to the carbon nanotubes too, reference is made to the details explained above.

The overall result of the processes described is, and the polymer-bound phase change material composition mentioned relates to, a pelletized material which can be used for further processing, in particular in the plastics injection molding process.

Figure 2:
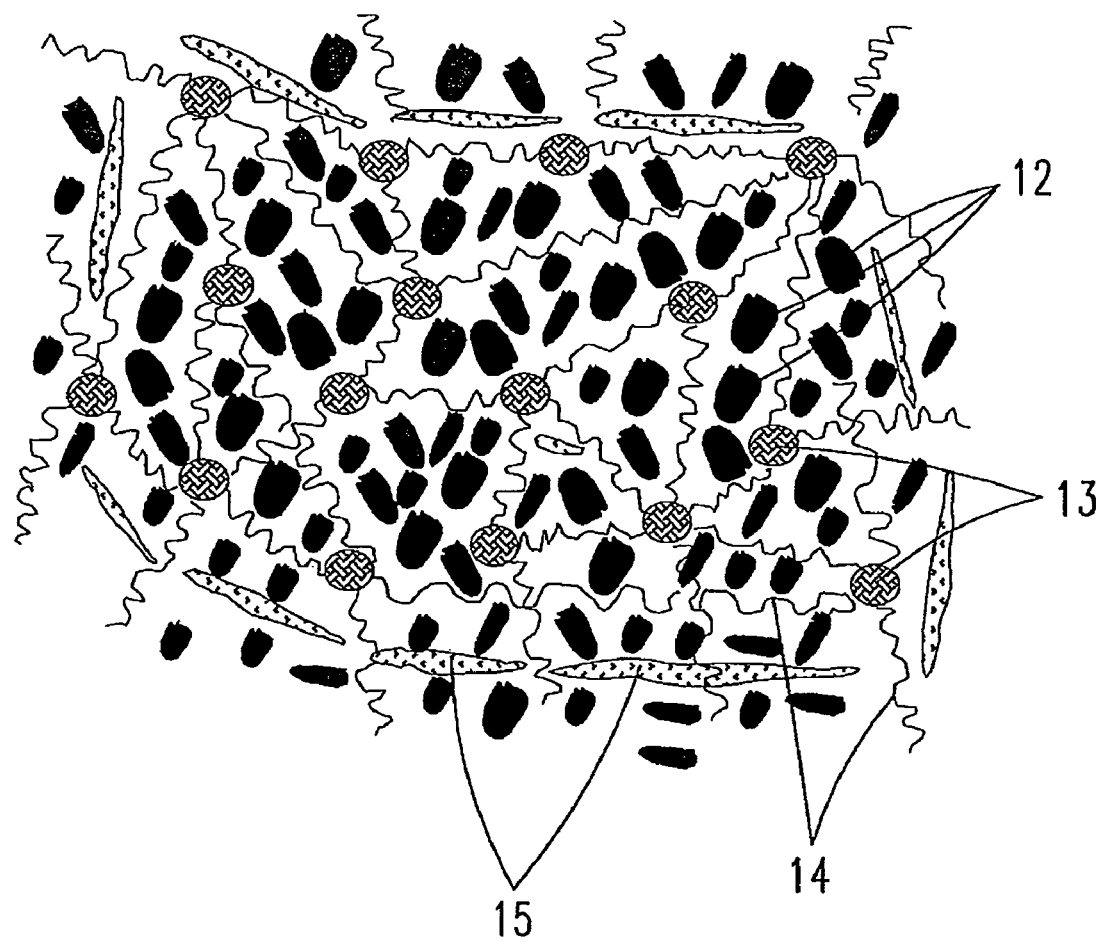
Figure 3:
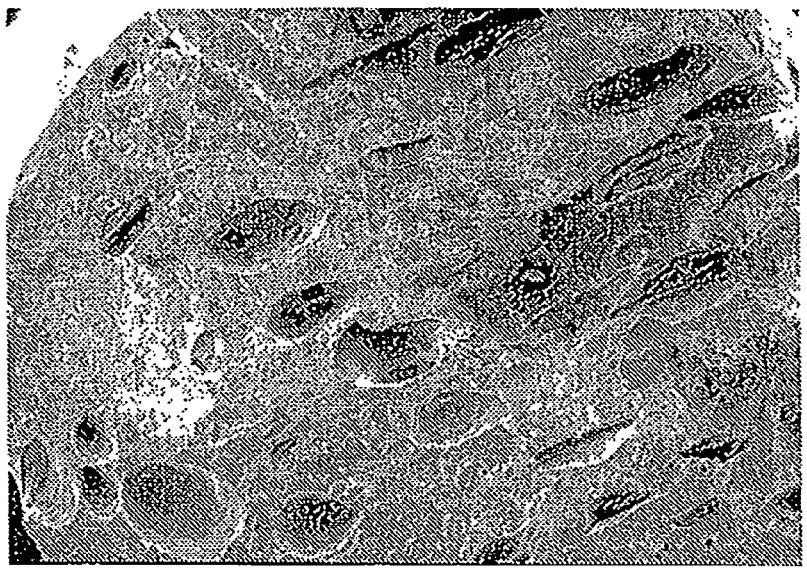
Figure 4:
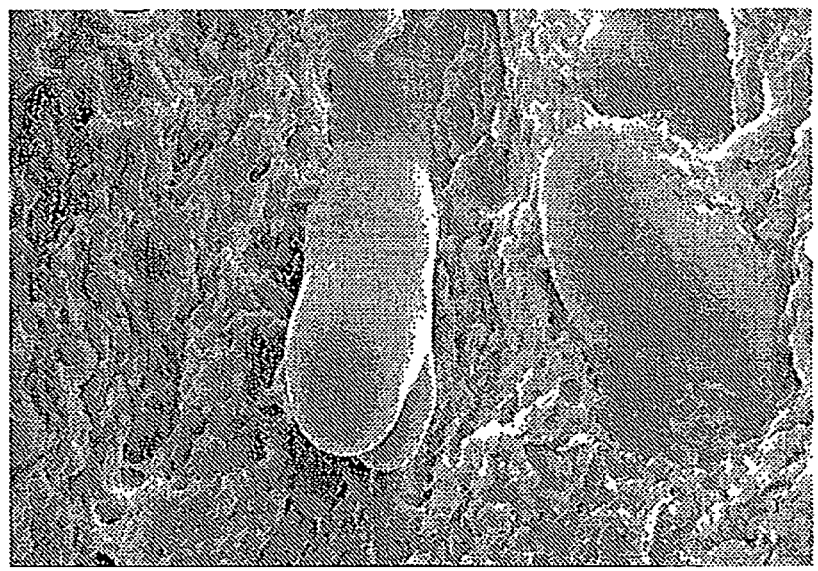
Figure 5:
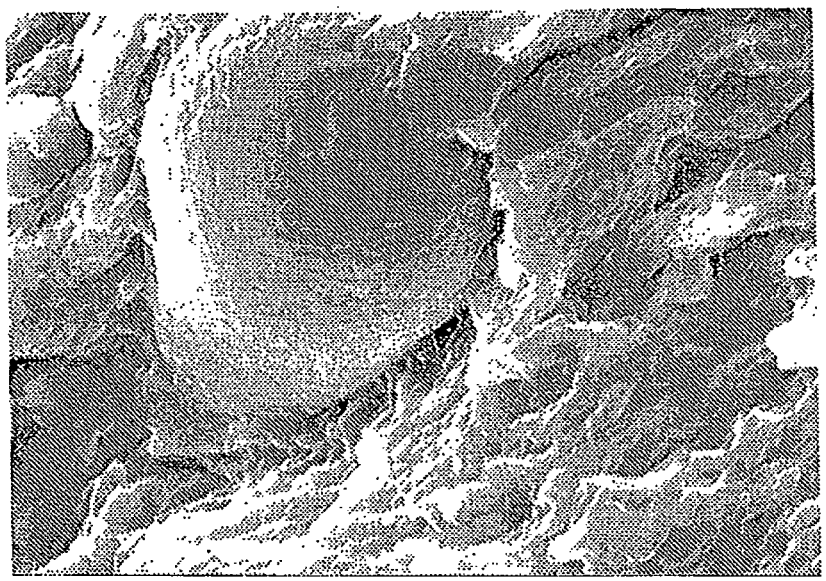
Figure 6:
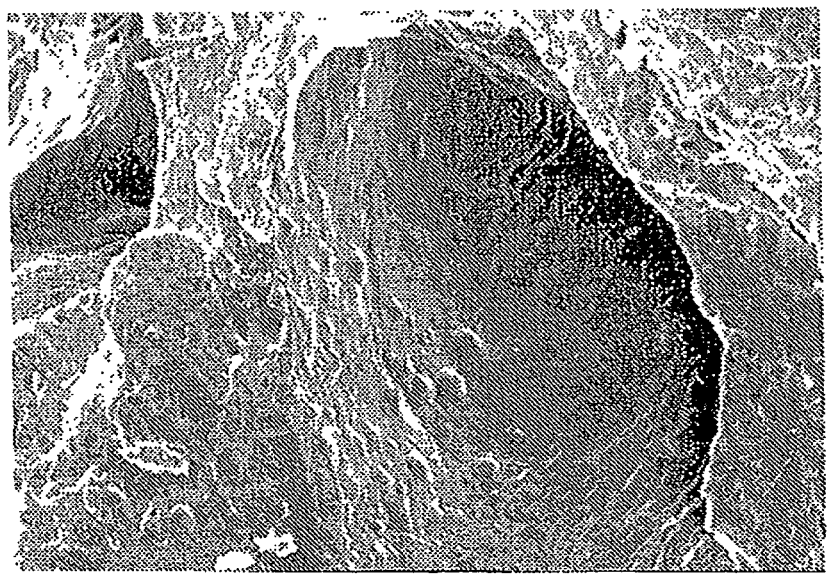
Figure 7:
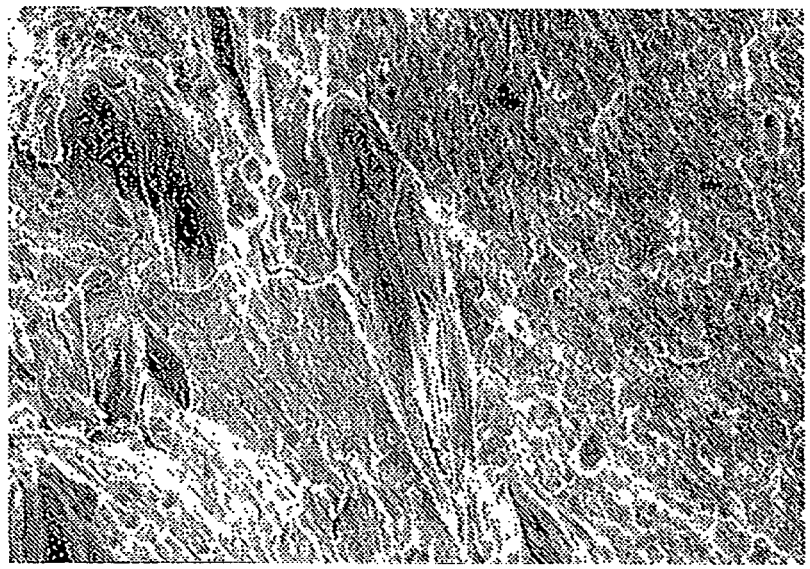
Figure 8:

The invention is further illustrated hereinafter with reference to the appended drawings, which, however, show merely working examples. The specific examples show:

FIG. 1 a schematic of the arrangement suitable for the process;

FIG. 2 an enlarged schematic of paraffin domains incorporated in an escape-proof manner in the network composed of styrene/ethylene/butadiene block copolymers and PMMA;

FIG. 3 a micrograph of a paraffin-PMMA/SEBS copolymer blend, in an enlargement in which 6 mm in the diagram corresponds to 100 μm;

FIG. 4 a reproduction of FIG. 3, in which 7 mm in the reproduction corresponds to 10 μm;

FIG. 5 a reproduction of FIG. 3 and FIG. 4, in which 3 mm in the reproduction corresponds to 1 μm;

FIG. 6 a reproduction of FIGS. 3 to 5, in which 4 mm in the reproduction corresponds to 20 μm;

FIG. 7 a reproduction of FIGS. 3 to 6, in which 3 mm in the reproduction corresponds to 20 μm;

FIG. 8 a reproduction of FIGS. 3 to 7, in which 4 mm in the reproduction corresponds to 20 μm.

With regard to FIG. 1, a twin-screw extruder 1 is shown, which is depicted in side view.

At the start of the extruder zone, in a first conveying zone a, the polymer, PMMA in the working example, is introduced from a reservoir vessel 2. At the same time, possibly a little downstream in conveying direction, an additive 3 is introduced, SEBS in the working example.

Significantly later in conveying direction, namely downstream of a first kneading zone designated b, liquid phase change material 5, namely paraffin in this case, is introduced via a nozzle 4. 6 denotes a heatable liquid metering pump.

The introduction is effected in the second conveying zone with delay zone c, downstream of the first kneading zone b.

The conveying zone with delay zone c is followed by a second kneading zone d, which alternates thereafter with a third conveying zone e, a third kneading zone f, a fourth conveying zone g and a further kneading zone with delay zone h, and discharge section i.

7 indicates heating of the reservoir vessel 8 for the liquid PCM.

After discharge from the extruder 1, the phase change material composition obtained passes through a water bath 9 and then a pelletizing operation 10. The pelletized material obtained is collected in a pellet collecting vessel 11.

A desirably dense polymer network structure is obtained in particular by, in the first kneading zone (b), the second conveying zone (c) and the second kneading zone (d), aiming a very high melting temperature of preferably 50° C.-150° C. above the feed temperature of the PCM, metering-in the phase change material, preferably in liquid form, at a temperature of 50° C. to 130° C. above the melting temperature of the PCM itself, employing a high shear rate by virtue of screw speeds of 500-1200 rpm, and residence times of the melt in the extruder of 1 to 4 minutes. Longer residence times above 4 minutes are actually possible but not advantageous since the low throughputs of PCM polymer composite then do not constitute an inexpensive production process. Residence times less than 1 minute and/or excessively high throughputs are also actually possible but worsen the homogeneous incorporation of the phase change material into the inadequately developed polymer network structure to a high degree, such that free unbound phase change material also leaves the extruder and, moreover, a pelletizable polymer composite strand is no longer obtained.

The baffle elements arranged according to FIG. 1, and a delay effect in general, give the desired effect of a prolonged residence time of the PCM polymer composite melt in the extruder of preferably 2 minutes or more, especially up to 5 minutes, the time span specified here too including all intermediate values, especially in steps of 1 second, whether to restrict the range from above and/or from below.

FIG. 2 is a schematic diagram of how the PCM domains 12 (paraffin here) are present, embedded into the network structure formed from the rigid styrene 13 and elastic butadiene block constituents 14 of the SEBS block copolymer used (Kraton 1651) and the stiff PMMA segments 15. The PMMA segments 15 form ring-like structures within which the network structures of the coupled-together rigid styrene constituents 13 and elastic butadiene block constituents 14 are embedded but also extend across these ring-like structures. Within a network mesh are a multiplicity of PCM domains 12.

The subsequent FIGS. 3 to 8 are various SEM images of a paraffin-PMMA/SEBS copolymer blend which has been obtained after cryofracture on the pellets obtained from example 1. In order to obtain this diagram, the sample was frozen and exposed to such high mechanical stresses that a fracture occurred owing to the high stiffness under cold conditions (cryofracture). It is evident from FIGS. 4 and 5 that the polymeric network structure composed of PMMA/block copolymer obtained encloses the paraffin domains on all sides such that they can no longer escape from the network structure, since even individual, apparently isolated paraffin domains already likewise have, in the interior thereof, the PMMA/block networks. The shape of the paraffin/PMMA/block copolymer network structure can be seen most clearly in FIGS. 7 and 8.

All features disclosed are (in themselves) pertinent to the invention. The disclosure content of the associated/accompanying priority documents (copy of the prior patent application) is also hereby incorporated in full in the disclosure of the application, including for the purpose of incorporating features of these documents in claims of the present application.

The invention claimed is:

1. A process for producing a phase change material composition, which is low-exudation, preferably exudation-free, is polymer-bound, and comprises phase change material, wherein the phase change material is liquefied, wherein the liquid phase change material is introduced at a temperature between 50° C. and 130° C., but at least 20° C. to 70° C. above the melting point of the phase change material, into an extruder into which the polymer is also introduced, said extruder having kneading, conveying and baffle elements, wherein the introduction of the phase change material into the extruder is undertaken downstream of the polymer in the direction of extrusion, the polymer used being LDPE, HDPE, LLDPE and/or a block-copolymer, and wherein PMMA (polymethyl methacrylate) is used to improve the in situ-effected polymer encapsulation of the PCM component and to improve mechanical performance and resistance to heat distortion.

2. The process as claimed in claim 1, wherein the phase change material is introduced in the nonencapsulated state and/or wherein the phase change material is introduced into the polymer material which serves as the matrix in an amount of up to 80% by weight.

3. The process as claimed in claim 1, wherein the introduction of the phase change material is undertaken in a single process stage for the purpose of intimate mixing with the polymer.

4. The process as claimed in claim 1, wherein the introduction of the phase change material into the extruder is undertaken in a region which comprises an end region of a first kneading zone and a starting region of an adjoining conveying zone of the extruder.

5. The process as claimed in claim 1, wherein phase change material (paraffin) having phase transition temperatures of −4° C. to 80° C. is incorporated into the polymer matrix network structure.

6. The process as claimed in claim 1, wherein the extruder is a screw extruder, preferably a twin-screw extruder, and/or the extruder is operated at a rotational speed between 500 and 1200 rpm.

7. The process as claimed in claim 1, wherein a residence time of a melt in the extruder is between 1 and 4 minutes and/or wherein a mean residence time of the melt is not less than 2 minutes.

8. The process as claimed in claim 1, wherein the total amount of the polymers used in a formulation is added in such an amount per unit time as to lead to a composition having a total content of polymers in the phase change material composition obtained of 10 to 40 percent by weight.

9. The process as claimed in claim 1, wherein one or more polymeric and/or inorganic additives are added, preferably the additives being added in such an amount that they correspond to 1 to 20 percent by weight of the phase change material composition obtained and/or one additive being a polymeric block copolymer, further preferably, SEBS, SEEPS, EPR and/or SBS being added as polymeric additive, and/or wherein carbon nanotubes, preferably multiwall carbon nanotubes, are added as inorganic additive to improve the formation of the PCM/polymer/additive network structure and to increase the thermal conductivity of the PCM/polymer composite.

10. The process as claimed in claim 1, wherein the temperature in the extruder is adjusted such that it is at least 20° C. to 180° C., preferably 50° C. to 150° C., above the feed temperature of the PCM.

11. The process as claimed in claim 1, wherein the phase change material composition obtained has a PCM content of 60 percent by weight or more.

12. The process as claimed in claim 1, wherein the PCM polymer composite melt emerging at the extruder outlet, without intermediate pelletization, is immediately subjected to further shaping to give slabs, thin-rolled films, fibers or nonwovens.

13. The process as claimed in claim 1, wherein the phase change material has a phase transition temperature in the range from −4° C. to 80° C. and/or wherein polymeric and/or inorganic additives are added.

14. A polymer-bound phase change material composition having a proportion of phase change material, a polymer in the form of LDPE, HDPE, LLDPE and block-copolymer, and a proportion of PMMA, the PMMA and the block-copolymer being present as a network structure and the phase change material being encapsulated within the network.

15. A polymer-bound phase change material composition having a proportion of phase change material, the polymer being LDPE, HDPE, and/or LLDPE and a block-copolymer, PMMA, and carbon nanotubes as additive, the PMMA and the block-copolymer being present as a network structure.

16. A polymer-bound phase change material according to claim 14, wherein the phase change material composition has a PCM content of at least 60% by weight.

* * * * *